(12) United States Patent
Henrysson

(10) Patent No.: US 6,796,225 B1
(45) Date of Patent: Sep. 28, 2004

(54) APPARATUS FOR COMPACTING OBJECTS

(75) Inventor: Leif Henrysson, Hasslarp (SE)

(73) Assignee: Tomra Systems ASA (NO)

( * ) Notice: Subject to any disclaimer, the term of this patent is extended or adjusted under 35 U.S.C. 154(b) by 0 days.

(21) Appl. No.: 09/889,004
(22) PCT Filed: Dec. 27, 1999
(86) PCT No.: PCT/SE99/02484
§ 371 (c)(1), (2), (4) Date: Sep. 24, 2001
(87) PCT Pub. No.: WO00/40397
PCT Pub. Date: Jul. 13, 2000

(30) Foreign Application Priority Data
Jan. 7, 1999 (SE) .............................................. 9900021

(51) Int. Cl.⁷ .............................. B30B 5/04; B30B 9/00
(52) U.S. Cl. ........................... 100/94; 100/49; 100/152; 100/902; 241/99
(58) Field of Search ........................... 100/49, 94, 152, 100/902, 151, 153, 154; 241/36, 99, 101.5; 194/205, 212; 209/583, 529

(56) References Cited

U.S. PATENT DOCUMENTS

| | | | |
|---|---|---|---|
| 3,691,942 A | * | 9/1972 | Wagley ....................... 100/151 |
| 4,261,259 A | | 4/1981 | Beardslee |
| 4,285,426 A | | 8/1981 | Cahill |
| 4,519,307 A | | 5/1985 | La Barge et al. |
| 4,532,859 A | | 8/1985 | Solordal |
| 4,573,641 A | * | 3/1986 | DeWoolfson et al. ......... 241/36 |
| 4,669,673 A | * | 6/1987 | Lodovico et al. ............. 241/99 |
| 4,703,899 A | * | 11/1987 | Lodovico ..................... 241/99 |
| 4,784,251 A | | 11/1988 | DeWoolfson et al. |
| 4,919,274 A | | 4/1990 | Hammond |
| 4,994,138 A | | 2/1991 | Prihoda ....................... 156/580 |

FOREIGN PATENT DOCUMENTS

| | | | |
|---|---|---|---|
| JP | 62199296 | 2/1988 | |
| JP | 63180398 | 11/1988 | |
| JP | 06155093 A | 6/1994 | ............. B30B/9/32 |
| SE | 9601790-0 | 11/1996 | |

\* cited by examiner

*Primary Examiner*—Allen Ostrager
*Assistant Examiner*—Jimmy Nguyen
(74) *Attorney, Agent, or Firm*—Bachman & LaPointe, P.C.

(57) ABSTRACT

An apparatus for compacting objects such as plastic bottles and cans whose material is to be recycled includes a detector device, two discharge openings and a compactor device. The detector device has at least one code reader for distinguishing approved from rejected objects. One of the two discharge openings is intended for approved objects and the other for rejected objects. The compactor device compacts the approved objects and has continuous, non-cyclic operation. As a result, waiting times are avoided between the discharge of an approved object and the commencement of the compaction thereof.

3 Claims, 8 Drawing Sheets

APPARATUS FOR COMPACTING OBJECTS

TECHNICAL FIELD

The present invention relates to an apparatus for compacting objects such as plastic bottles and cans whose material is to be recycled, and comprises a detector device which at least displays one code reader for reading-off a code on the object with a view to separating an approved object from a rejected object, and a discharge opening for approved objects, and preferably also a second discharge opening for rejected objects; and a compactor device for receiving approved objects from the detector device and compaction thereof.

BACKGROUND ART

An apparatus of the type outlined by way of introduction is previously known in the art. In this apparatus, the compactor device has two reciprocally movable press plates which between them compact an approved object. In operation, these press plates reciprocate cyclically towards and away from one another, respectively, but are not stopped in a starting position for compaction where the plates would be located a maximum distance away from each other, since this would involve an excessive number of regularly recurring starts and stops, with consequential delays.

In purely mechanical terms, the above-outlined compactor device functions excellently but cannot readily be coordinated in time with the operation of the detector device. If an approved object is discharged from the detector at a point in time when the press plates are moving towards one another and the distance between them is so slight that the approved object does not have room between them, the object is not compacted directly, but the plates must first close together and then once again move away from one another in order to reverse at their limit positions before any compaction operation can take place. This involves, in the worst case scenario, a waiting time almost corresponding to the time for a complete reciprocal cycle of the press plates.

Problem Structure

The present invention has for its object to design the apparatus intimated by way of introduction such that it may be run in an optimum working timetable substantially completely without waiting times so that it is the infeed speed to the detector device which fundamentally determines and controls the work rate. The present invention further has for its object to realise an apparatus in which residual beverage contents in the objects realise the least possible dirtying or fouling of sensitive components. Finally, the present invention has for its object to design the apparatus such that this will be simple and robust in construction, as well as being operationally reliable.

Solution

The objects forming the basis of the present invention will be attained if the apparatus intimated by way of introduction is characterized in that the compactor device is designed for continuous, non-cylic operation, whereby waiting times are substantially eliminated, from the discharge of an approved object from the detector device and until the compaction operation is commenced.

BRIEF DESCRIPTION OF THE ACCOMPANYING DRAWINGS

The present invention will now be described in greater detail hereinbelow, with particular reference to the accompanying Drawings. In the accompanying Drawings.

DESCRIPTION OF PREFERRED EMBODIMENT

Figure 1:
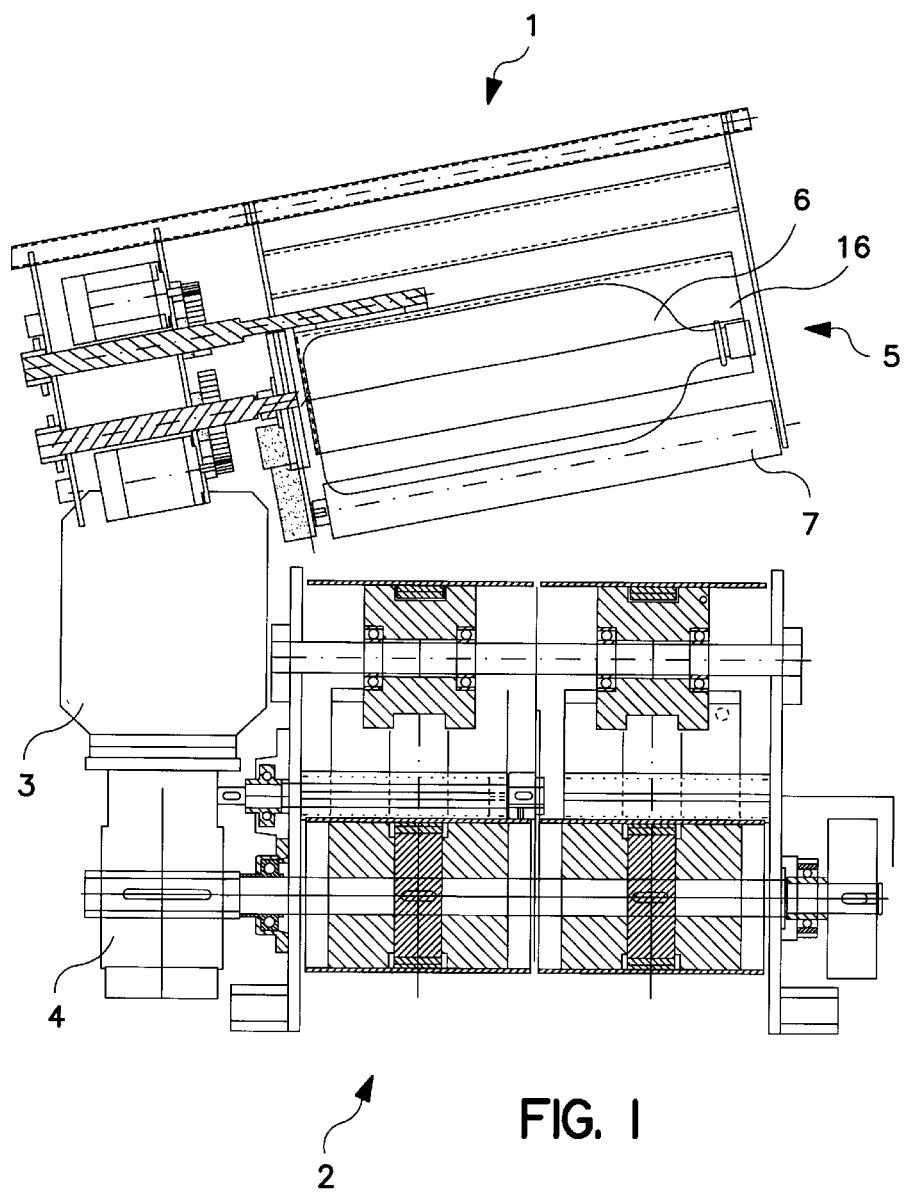
FIG. 1 is a vertical side elevation, partly in cross section, of the apparatus according to the present invention.

It will be apparent from FIG. 1 that the apparatus according to the present invention includes a detector device 1 and a compactor device 2 located beneath the detector device and powered by the action of a drive motor 3 and a gear arrangement 4.

Figure 2:
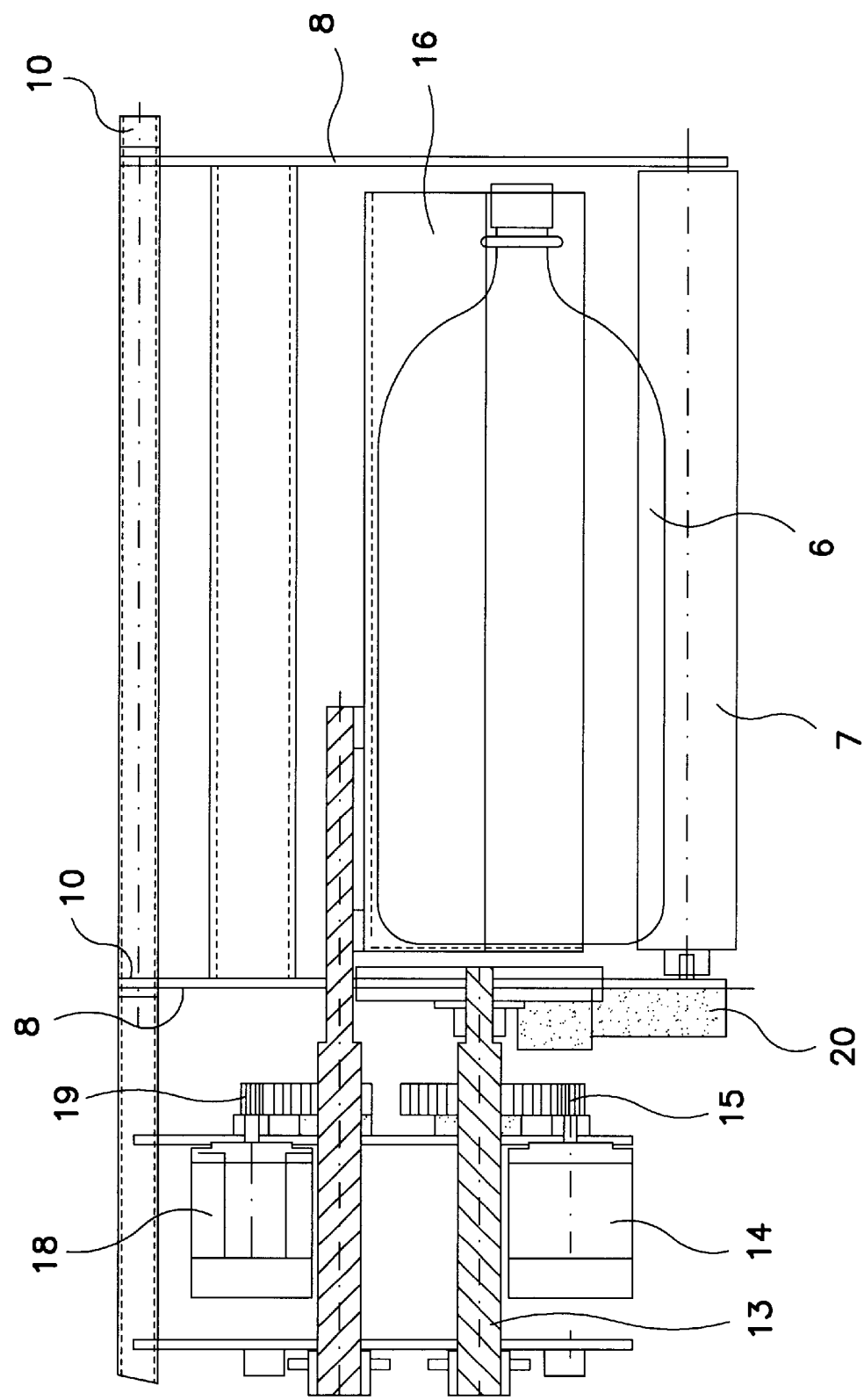
FIG. 2 is a vertical side elevation, partly in cross section, of a detector device included in the apparatus according to the present invention.

The detector device has an infeed opening marked by the arrow 5, the infeed opening being intended for objects which are to be sensed or identified and, after approval, be compacted. In FIGS. 1 and 2, an object 6 is in position for detection and it will be apparent from the Drawings that the object 6 is exemplified by means of a plastic bottle. It will further be apparent from FIG. 1 that the longitudinal axis of the bottle makes an acute angle with the horizontal plane, with its end most proximal the infeed opening 5 being located uppermost.

Figure 3:
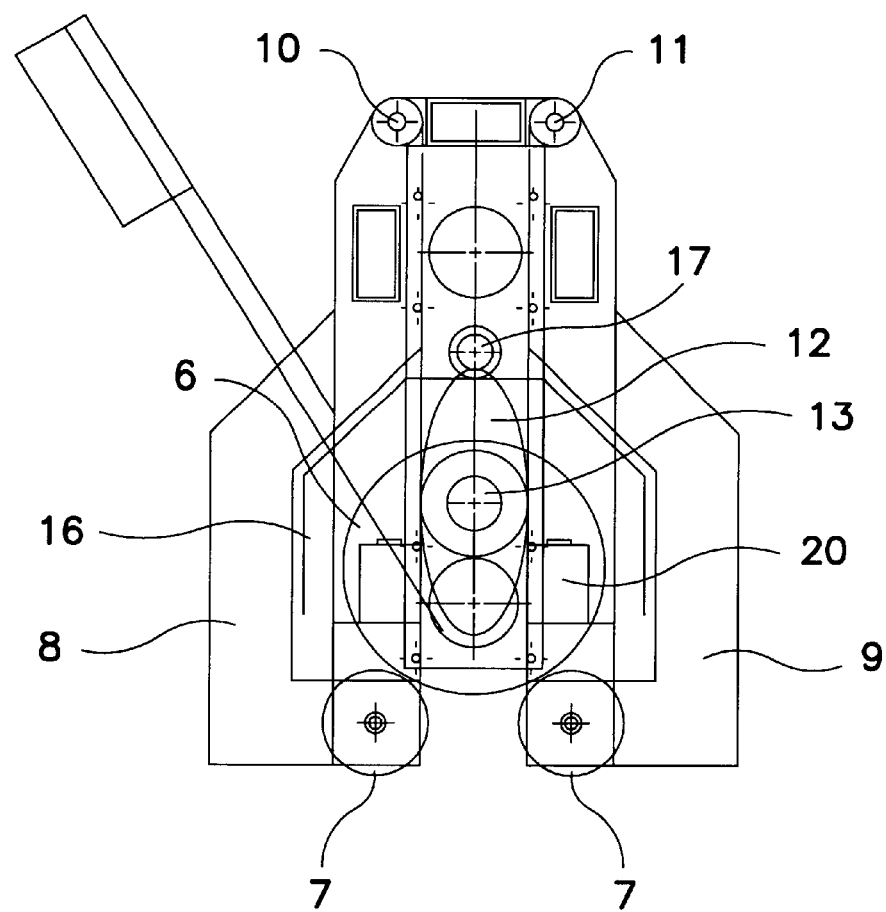
FIG. 3 shows the detector device of FIG. 2 seen from the right in the Figure and in a state for detection.

As will be apparent from FIGS. 2 and 3, the bottle 6 rests on support members 7 which are designed as rotary rollers. By rotating the rollers, the bottle is also caused to rotate about its longitudinal axis, so that a code placed on the bottle may be read-off by a sensor placed in the detector device. If the code read-off by the sensor is acceptable, the bottle 6 is classified as approved for recycling.

In addition to the above-disclosed sensor, the detector device 1 also preferably includes an additional sensor whose purpose is to ensure that the bottle is empty, that it does not consist of or contain metal, that the weight of the bottle falls within permitted limits, etc., etc.

If a bottle 6 has been detected in the detector device and been approved, it is discharged straight downwards from the detector device and falls down on the compactor device.

In the detector device 1, both of the support members 7 are rotatably suspended in pendulum arms 8 and 9 which are pivotal about stub shafts 10 and 11, respectively. While only one pair of pendulum arms 8 and 9 is shown in FIGS. 3 and 4, it will be apparent from FIG. 2 that an addition pair of pendulum arms is disposed at the opposite and inner end (left-hand) of the support members 7.

Figure 4:
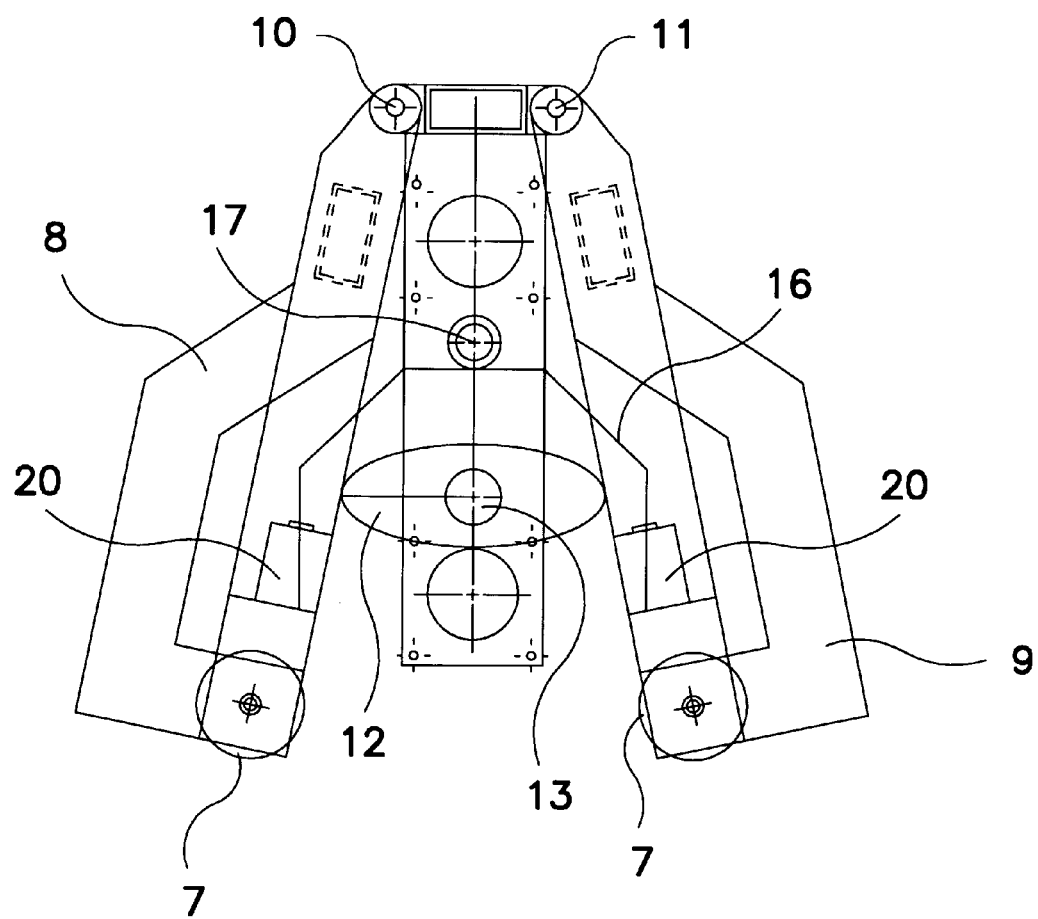
FIG. 4 shows the detector device of FIG. 2 seen from the right in the Figure and in a state for the discharge of an approved object.

In FIG. 4, the pendulum arms 8 and 9 are pivoted away from one another about the above-mentioned stub shafts 10 and 11, and in this position the distance between the two support members 7 is greater than the transverse dimension of the bottle 6 so that this is permitted to fall straight down.

The outward pivoting of the pendulum arms 8 and 9 from the position illustrated in FIG. 3 to the position illustrated in FIG. 4 is realised by means of an elliptical cam device 12 which is rotary together with a shaft 13. The shaft 13 is rotary under the action of a motor 14 and a cogged gear 15 (FIG. 2).

As will have been apparent from the foregoing, the detector device 1 has a downwardly directed discharge opening for approved bottles. On the other hand, such bottles as are rejected are removed laterally in FIG. 2 (towards the observer of the Figure) with the aid of a channel-shaped, downwardly open ejector device 16 which is connected to a shaft 17 and is pivotal together therewith. A motor 18 and a cogged gear 19 drive the shaft 17 in its pivotal movement.

In order to realise the above-considered rotation of the two support members 7, the inner pair of pendulum arms 8 and 9 displays drive means 20 which are coupled to the two support members 7.

The detector device operates as follows:

an object 6 which is to be detected enters, in the direction of the arrow 5 in FIG. 1, in onto the two support members 7, these being then set in rotation so that the object 6 is caused to rotate about its longitudinal axis. Here, the above-mentioned sensor senses the code which should be placed on the object. As was intimated above, other types of inspection may be carried out with a view either to approving the object for recycling or reject it for removal. If the object is found to be approved, the motor 14 starts so that the cam device 12 is rotated a quarter of a revolution from the position illustrated in FIG. 3 to the position illustrated in FIG. 4, the pendulum arms 8 and 9 (and also the rear pendulum arms) being pivoted away from one another so that the object 6 may fall unimpeded straight down between the support members 7.

If the object 6 is not found acceptable for recycling, the motor 18 is started instead, whereby the ejector device 16 is pivoted approx. 90° in a clockwise direction (FIGS. 2 and 3) around the shaft 17. As a result, the object will roll out in a lateral direction onto the one support member in order thereby to be returned to the person who fed in the object, or be removed by other means.

Figure 6:
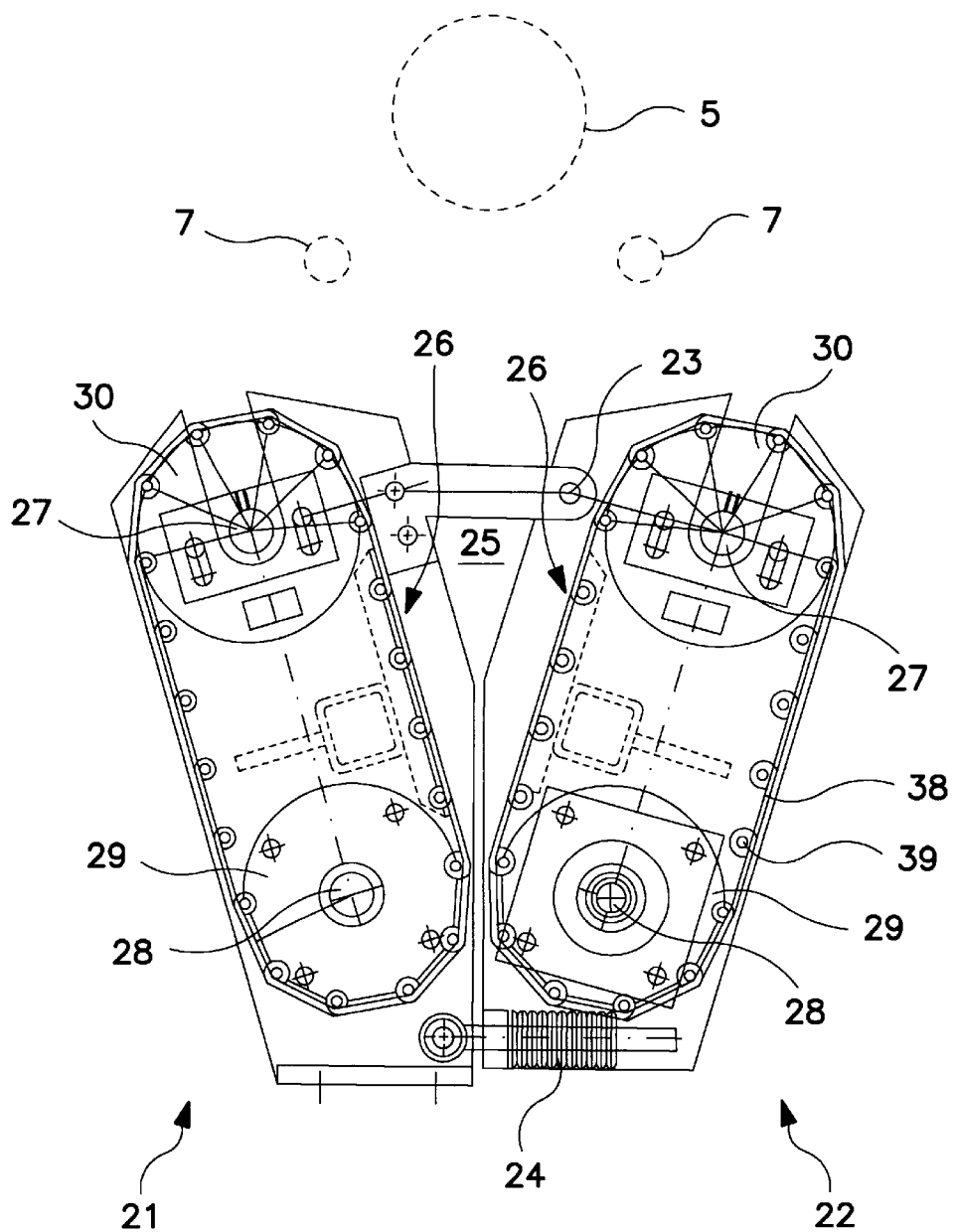
FIG. 6 is a vertical view, partly in cross section, of the compactor device according to FIG. 5 seen from the right in this Figure.
Figure 7:
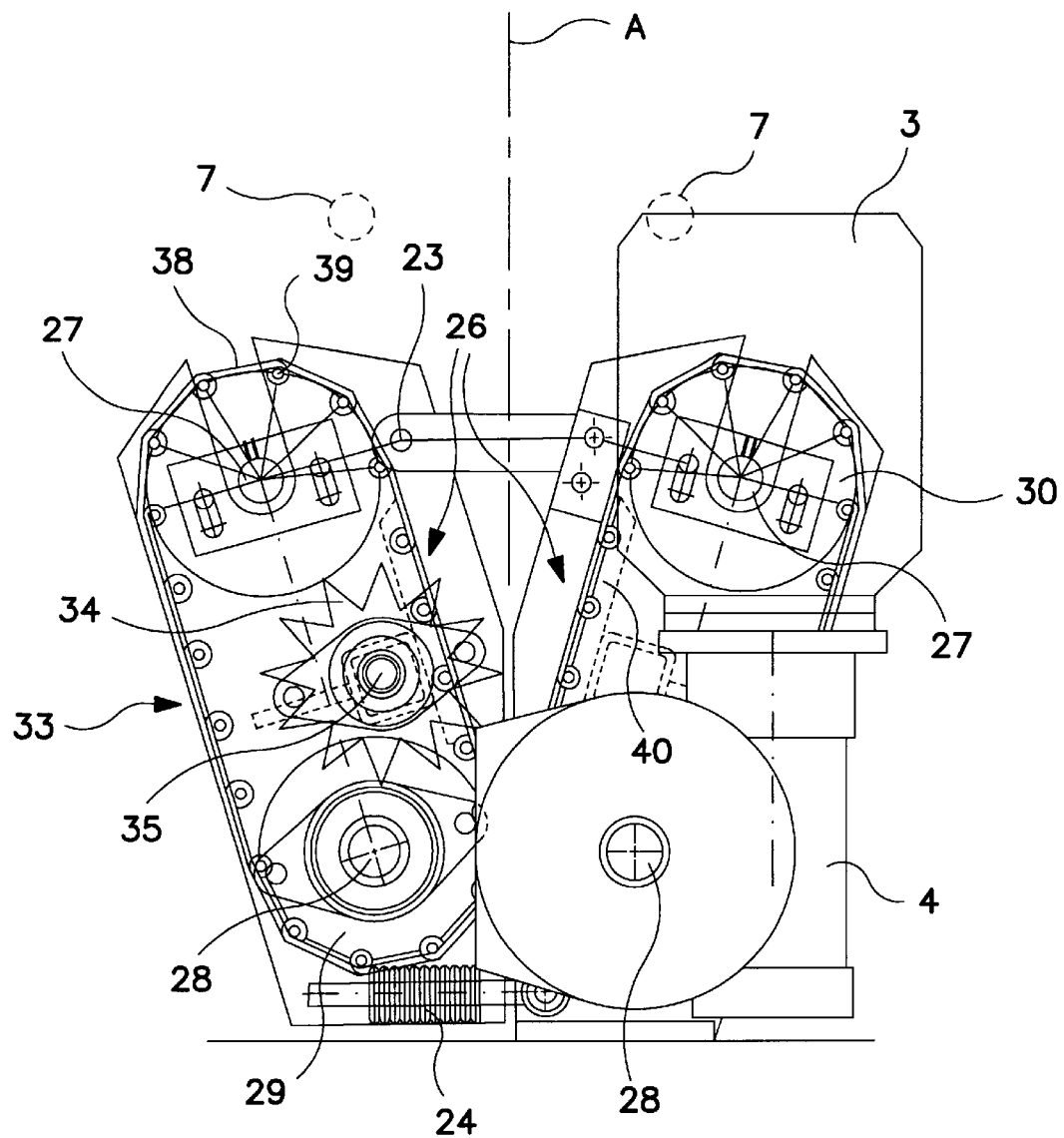
FIG. 7 is a view corresponding to that of FIG. 6, but seen from the left in FIG. 5.

As was mentioned above, an approved object is discharged from the detector device 1 in a vertical downward direction. It will be apparent from FIG. 1 that the compactor device 2 is placed immediately beneath the detector device and has its infeed end turned to face upwards and in register with the discharge opening of the detector device. In FIGS. 6 and 7, broken lines intimate, on the one hand, the infeed opening 5 to the detector device and, on the other hand, the end positions of the two support members 7 when these are located in a position for discharge of an object 6. It will further be apparent that the support members 7 are located on a higher level in FIG. 6 than they are in FIG. 7, which illustrates the slope of the longitudinal direction of the support members.

Straight beneath the discharge opening of the detector device, between the outwardly pivoted support members 7, the compactor device 2 has a downwardly tapering cuneiform compaction space 25 (FIGS. 6 and 7) in which an object 6 moves downwards during the compaction. This implies that the object, throughout its entire passage through the apparatus according to the present invention moves vertically, substantially along a straight line from above and downwards. With this continuous movement of the object, substantially without any lateral movement, any possible beverage residues remaining in the object (which are released during the compaction) will follow the same path of movement downwards and arrive in a receptacle space located beneath the compactor device, together with the compacted object. As a result, fouling of the operative equipment is reduced to a minimum, at the same time as the transport path for the objects 6 will be as short as possible.

The compactor device 2 includes two belt assemblies 21 and 22, where the belt assembly 21 may be considered as fixed and connected to the motor 3 by the intermediary of the gear arrangement 4. On the other hand, the belt assembly 22 is movable towards and away from the belt assembly 21 by being pivotal in relation to it about a pivot shaft 23. At the lower ends, the belt assemblies 21 and 22 are interconnected by the intermediary of spring means 24 which pre-tension the lower ends of the belt assemblies 21 and 22 towards one another but which, against the spring bias, permit pivoting away of the lower end of the movable belt assembly 22 to some extent away from the fixed belt assembly 21.

The belt assemblies 21 and 22 form between them the above-mentioned downwardly tapering, cuneiform compaction space 25 which is defined by the belt parts 26 which both move downwards during operation. An object which falls down into the compaction space 25 will therefore come into contact with the two belt parts 26 which move downwards, i.e. in that direction in which the compaction space tapers. From here it follows that the object is driven by the belt parts 26 and is compressed by them gradually as the compaction space becomes narrower.

If the object which passes downwards through the compaction space 25 were to prove too mechanically stable to completely undergo compaction, or prove to contain a hard object, the apparatus does not stop, but the movable belt assembly 22 is pivoted with its lower end to some extent away from the fixed belt assembly 21 against the action of the spring means 24.

Each belt assembly 21 and 22 has an upper shaft 27 and a lower shaft 28. All of these shafts are preferably horizontal and mutually parallel.

Figure 5:
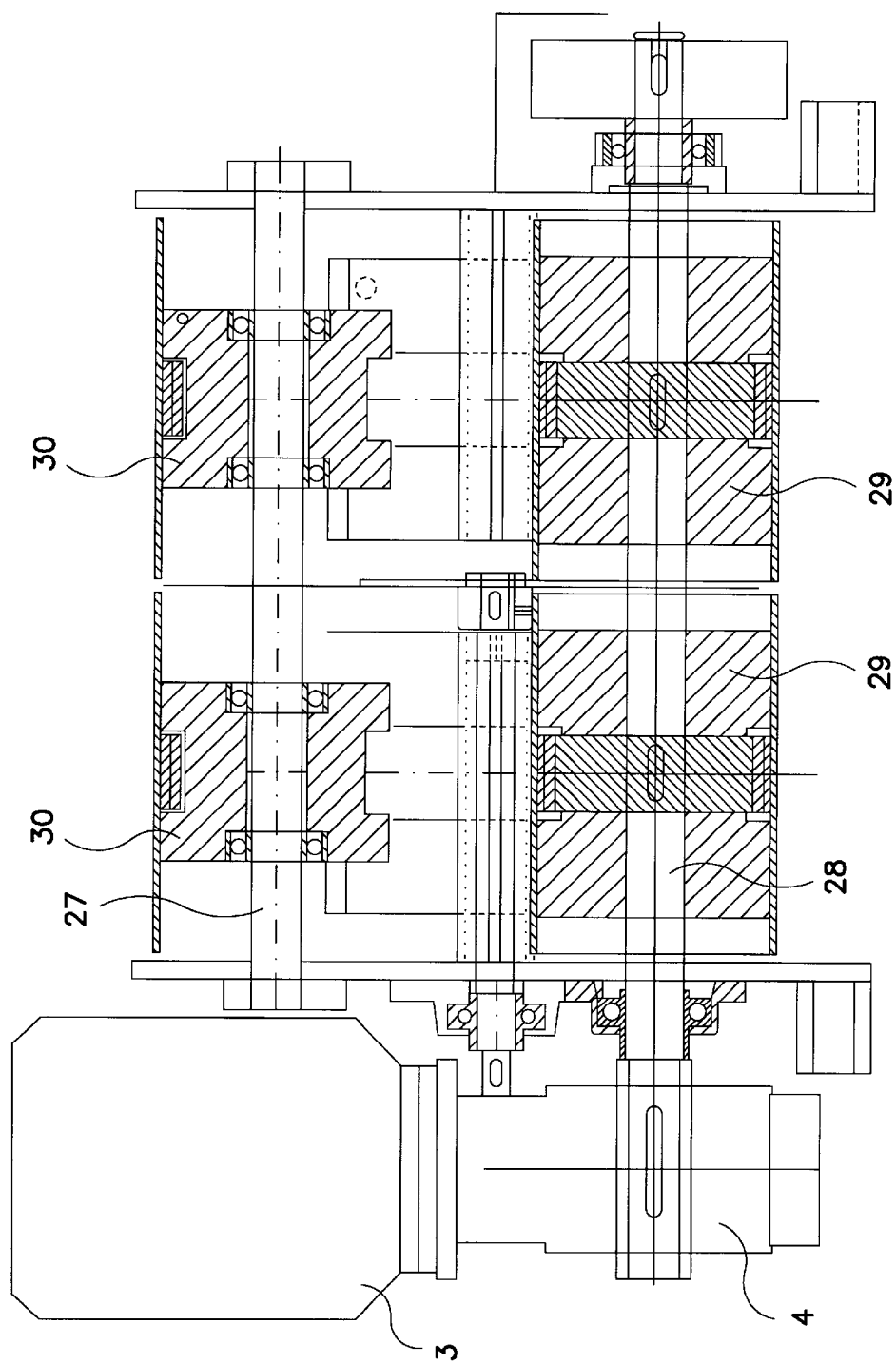
FIG. 5 is a vertical side elevation, partly in cross section, of a compactor device included in the apparatus of FIG. 1.

The lower shaft 28 in the fixed belt assembly 21 is positively coupled to the motor 3 by the intermediary of the gear arrangement 4 and is, as is apparent from FIG. 5, rotatably fixedly connected to rollers 29 or corresponding rolling devices over which run the belts included in the belt assemblies. Correspondingly, the upper shaft 27 has free-running rollers 30 or corresponding rolling devices over which run the upper parts of the belts. As was mentioned above, the lower shaft 28 of the fixed belt assembly 21 is a driving shaft which has a gear wheel 31 (see FIG. 8) in its end facing away from the drive motor 3, the gear wheel engaging with a second gear wheel 32 of equal size on the lower shaft 28 of the movable belt assembly 22.

In order to prevent a bottle which still has its cap tightly screwed in place from exploding while undergoing compaction, there is provided, in the compaction space 25, a puncture device 33 which includes an axially slim wheel which displays a number of radially projecting, sharp teeth 34. The wheel is rotatably fixedly connected to a shaft 35 which, by the intermediary of cogged gear 36, drives the shaft 25 from the lower shaft 28 of the movable belt assembly 22.

Figure 8:
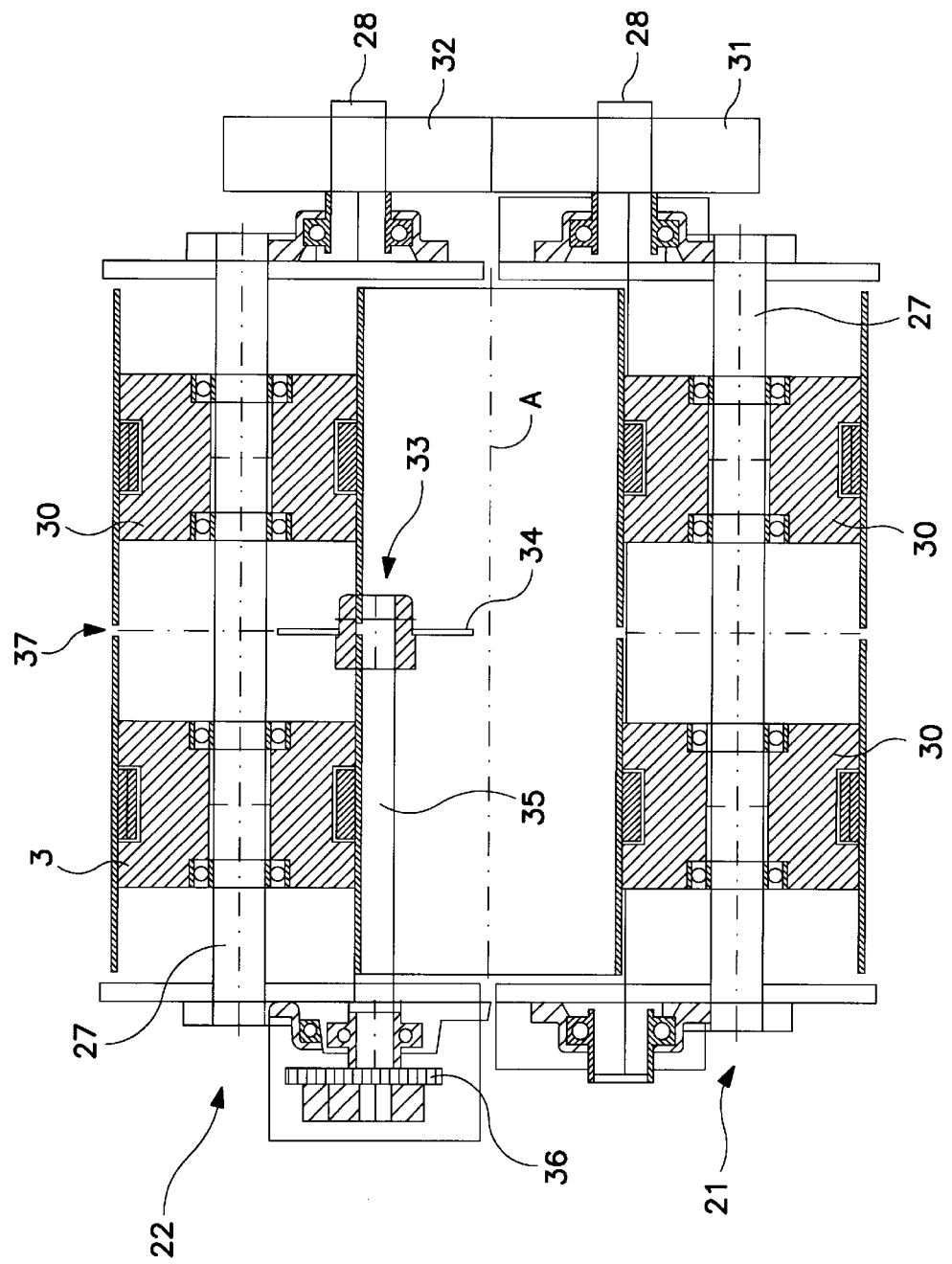
FIG. 8 is a top plan view, partly in cross section, of the compactor device of FIG. 5.

It will be apparent from FIG. 7 that the puncture device 33 is largely located inside the downwardly moving belt part 26 on the movable belt assembly 22. In order to permit the teeth 34 to extend into the compaction space 25, at least the moving belt assembly has two belts which, between them, have an axial interspace 37 (FIG. 8). For reasons of production engineering, the fixed belt assembly 21 may also have two belts which are spaced in the axial direction.

The belts of the belt assemblies are composed of a number of plates 38 produced from substantially rigid material and pivotally interconnected by the intermediary of joints 39. On the insides of the two downwardly running belt parts 26 which define the compaction space 25, the belts display support rails 40 for their guiding and support, the support rails preventing the belts from being forced away from one another under loading, so that the configuration of the compaction space 25 could thereby be changed and the belts possibly be deformed or destroyed.

The present invention should not be considered as restricted to that described above and shown on the Drawings, many modifications being conceivable without departing from the scope of the appended claims.

What is claimed is:

1. An apparatus for compacting objects whose material is to be recycled, comprising:
   a detector device which at least displays one code reader for reading-off a code on the object with a view to separating an approved object from a rejected object, and a discharge opening for approved objects;
   and a compactor device for receiving approved objects from the detector device and compaction thereof,
   characterized in that the compactor device is designed for continuous, non-cyclic operation, further characterized in that means are provided in the compactor device for puncturing an object, said puncturing means being located such that no appreciable compaction of the object has taken place before the object is punctured, and at least one belt assembly has two belts which have an axial interspace; and that said puncturing means extends through this interspace.

2. The apparatus as claimed in claim 1, characterized in that said puncturing means includes a rotatably driven, axially slim wheel having sharp, radially projecting teeth.

3. An apparatus for compacting objects comprising material to be recycled, comprising:
   a detector device comprising at least one code reader for reading-off a code on said object in order to separate an approved object from a rejected object;
   a compactor device for receiving approved objects from the detector device and performing compaction thereof, said compactor device having two belt assemblies forming therebetween a cuneiform compaction space tapering in a direction in which said object is urged by the belt assemblies;
   each belt assembly comprising a belt comprising a plurality of plates made of a substantially rigid material, said plurality of plates being pivotably interconnected with one another;
   said apparatus further characterized in that means are provided in the compactor device for puncturing an object, said puncturing means being located such that no appreciable compaction of the object has taken place before the object is punctured; and
   wherein at least one of said belt assemblies has two belts which have an axial interspace; and that said puncturing means extends through this interspace.

* * * * *